US012780017B2

(12) United States Patent
Robinson et al.

(10) Patent No.: US 12,780,017 B2
(45) Date of Patent: Nov. 3, 2026

(54) SEQUENTIAL DC FAST CHARGING WITH INTEGRATED SIMULTANEOUS AC CHARGING

(71) Applicant: Caterpillar Inc., Peoria, IL (US)

(72) Inventors: Andrew Blake Robinson, Highland, IL (US); Dustin Craig Selvey, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 664 days.

(21) Appl. No.: 18/238,946

(22) Filed: Aug. 28, 2023

(65) Prior Publication Data

US 2025/0074218 A1 Mar. 6, 2025

(51) Int. Cl.

*B60L 53/10* (2019.01)
*B60L 53/62* (2019.01)
*B60L 53/66* (2019.01)
*B60L 58/15* (2019.01)
*B60L 58/18* (2019.01)

(52) U.S. Cl.

CPC ............... *B60L 53/11* (2019.02); *B60L 53/62* (2019.02); *B60L 53/66* (2019.02); *B60L 58/15* (2019.02); *B60L 58/18* (2019.02); *B60L 2200/40* (2013.01)

(58) Field of Classification Search

CPC ........................................ B60L 53/11
USPC ........................................ 320/109
See application file for complete search history.

(56) References Cited

U.S. PATENT DOCUMENTS 8,890,474 B2 11/2014 Kim et al.
9,623,762 B2 4/2017 Park
11,292,351 B2 4/2022 Dow
2010/0207581 A1* 8/2010 Sakaue .................. H02J 7/50 320/134
2014/0091764 A1 4/2014 Kinomura et al.
2016/0020443 A1* 1/2016 White .................. B25F 5/00 318/245
2021/0252991 A1 8/2021 Carmine et al.
2022/0105810 A1* 4/2022 Krenn .................. H02M 1/32
2023/0035165 A1* 2/2023 Baumann .................. B60L 50/16
2023/0067233 A1 3/2023 Noh et al.
2023/0112291 A1* 4/2023 Frelich .................. B60L 58/12 180/53.5

FOREIGN PATENT DOCUMENTS

CN 203984046 12/2014
CN 107891773 4/2018
CN 113335095 3/2022

OTHER PUBLICATIONS

Written Opinion and International Search Report for Int'l. Patent Appln. No. PCT/US2024/038450, mailed Nov. 15, 2024 (16 pgs).

* cited by examiner

*Primary Examiner* — Yalkew Fantu
(74) *Attorney, Agent, or Firm* — Schwegman, Lundberg & Woessner

(57) ABSTRACT

Various techniques to start the sequential DC fast charging process of an electric machine and then switch to AC charging of the electric machine at a given state of charge percentage while also starting to DC fast charge another electric machine in the fleet.

20 Claims, 5 Drawing Sheets

SEQUENTIAL DC FAST CHARGING WITH INTEGRATED SIMULTANEOUS AC CHARGING

TECHNICAL FIELD

This disclosure relates generally to energy storage systems for electric machines.

BACKGROUND

Battery electric machines are a type of electric vehicle that rely solely on electric power stored in a battery module to propel and operate the machine. Unlike hybrid vehicles that combine internal combustion engines with electric motors, battery electric machines operate entirely on electricity, making them an environmentally friendly alternative to gasoline or diesel-powered machines. These machines utilize electric motors powered by high-capacity battery modules, which provide the necessary energy to drive the vehicle's traction system, such as include wheels and/or tracks.

Battery modules are the heart of battery electric machines. They are composed of multiple individual battery cells, such as lithium-ion or lithium-polymer, that store electrical energy chemically. These cells are interconnected and packaged together in a compact and robust unit, ensuring efficient energy storage and delivery. The size and capacity of battery modules vary depending on the specific machine and its intended use. Higher-capacity battery modules allow battery electric machines to operate longer on a single charge.

US20230067233A1 relates to an electric vehicle charging device and to a method for controlling same. The electric vehicle charging device includes a plurality of charging cables installed in one electric vehicle charger. After battery charging of a vehicle, which has arrived first, is completed using one charging cable, a next vehicle is immediately charged using another charging cable such that even in a state where the vehicle, which has arrived first, does not leave a charging station, the next vehicle can be charged. Accordingly, it is possible to improve convenience of an electric vehicle user, and minimize waiting time for charging. Therefore, it is possible to improve the operational efficiency of the electric vehicle charger.

SUMMARY

This disclosure describes various techniques to start the sequential DC fast charging process of an electric machine and then switch to AC charging of the electric machine at a given state of charge percentage while also starting to DC fast charge another electric machine in the fleet.

In some aspects, this disclosure is directed to a charging system for charging a first electric machine and a second electric machine, the system comprising: a charging power cabinet configured to electrically couple with an AC source, the charging power cabinet configured to convert an AC voltage from the AC source to a DC voltage; a first electric power dispenser configured to electrically couple with the charging power cabinet and the first electric machine, the first electric power dispenser configured to provide either first AC power or first DC power to charge a plurality of battery modules of the first electric machine; a second electric power dispenser configured to electrically couple with the charging power cabinet and the second electric machine, the second electric power dispenser configured to provide either second AC power or second DC power to charge a plurality of battery modules of the second electric machine; and a controller configured to: receive, while the first electric machine receives the first DC power and while the second electric machine receives the second AC power, a representation of a state of charge of the plurality of battery modules of the first electric machine; compare the representation of the state of charge of the plurality of battery modules of the first electric machine to a threshold value; when the state of charge of the plurality of battery modules of the first electric machine exceeds the threshold value: control termination of delivery of the first DC power from the first electric power dispenser to the first electric machine; and control commencement of delivery of the first AC power from the first electric power dispenser to a first onboard charger of the first electric machine.

In some aspects, this disclosure is directed to a method for charging a first electric machine and a second electric machine, the method comprising: delivering a first DC power from a first electric power dispenser to the first electric machine and delivering a first AC power from a second electric power dispenser to a second electric machine; receiving, while the first electric machine receives the first DC power and while the second electric machine receives the first AC power, a representation of a state of charge of a plurality of battery modules of the first electric machine; comparing the representation of the state of charge of the plurality of battery modules of the first electric machine to a threshold value; when the state of charge of the plurality of battery modules of the first electric machine exceeds the threshold value: terminating delivery of the first DC power from the first electric power dispenser to the first electric machine; and commencing delivery of a second AC power from the first electric power dispenser to the first electric machine.

In some aspects, this disclosure is directed to a charging system for charging a first electric machine and a second electric machine, the system comprising: a controller configured to: receive, while the first electric machine receives a first DC power and while the second electric machine receives a second AC power, a representation of a state of charge of the plurality of battery modules of the first electric machine; compare the representation of the state of charge of a plurality of battery modules of the first electric machine to a threshold value; when the state of charge of the plurality of battery modules of the first electric machine exceeds the threshold value: control termination of delivery of the first DC power from a first electric power dispenser to the first electric machine; and control commencement of delivery of the first AC power from the first electric power dispenser to a first onboard charger of the first electric machine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A problem recognized by the present inventors is that the time to fully charge a number of electric vehicles is increased due to DC charger limitations, such as only being able to supply DC power sequentially to the electric vehicles. Also, preconditioning an electric machine results in a lost state of charge if not being powered by a charger. The present inventors have recognized a need to reduce the time needed to charge a number of electric vehicles.

This disclosure describes various techniques to start the sequential DC fast charging process of an electric machine and then switch to AC charging of the electric machine at a given state of charge percentage while also starting to DC fast charge another electric machine in the fleet.

Figure 1:
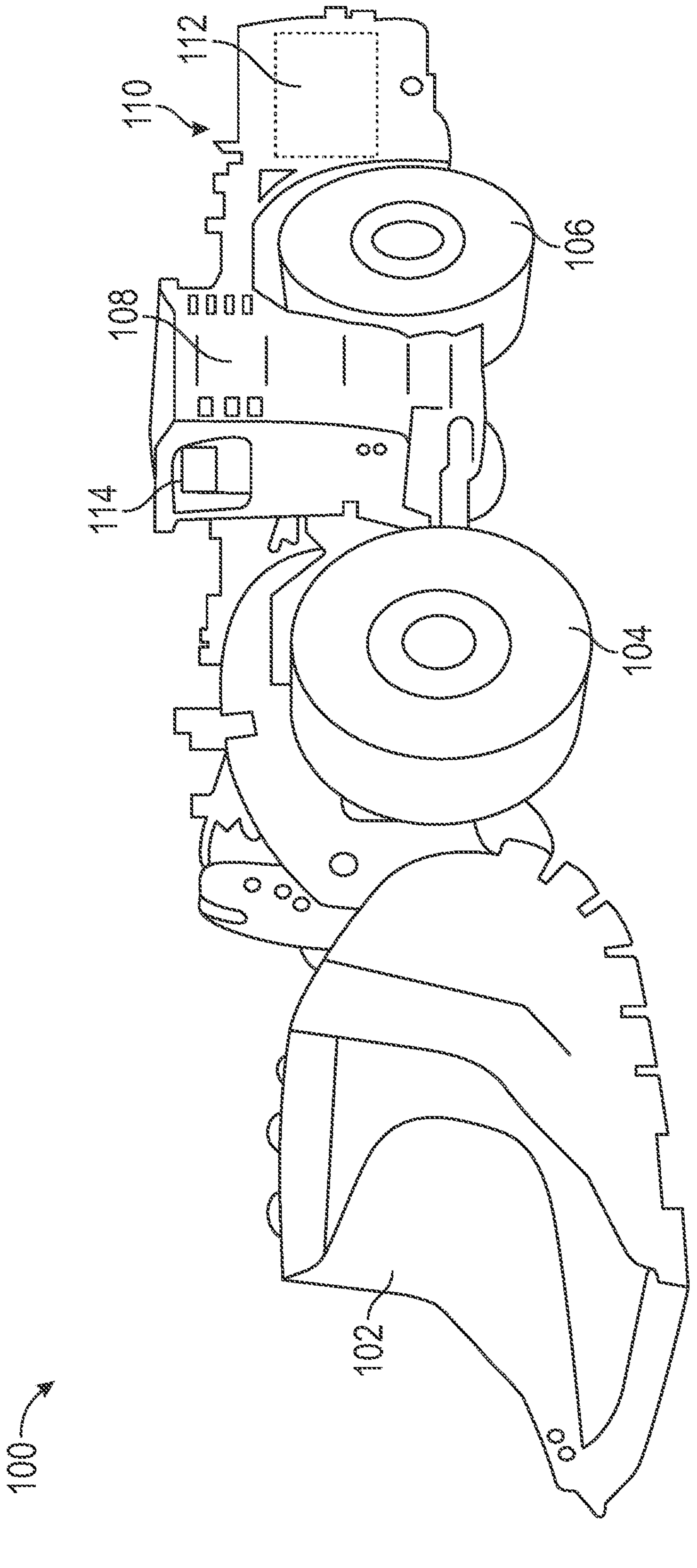
FIG. 1 is a perspective view of an example of an electric machine (at least partially battery powered) that can implement various techniques of this disclosure.

FIG. 1 is a perspective view of an example of an electric machine 100 (at least partially battery powered) that can implement various techniques of this disclosure. FIG. 1 depicts a non-limiting view of an electric machine 100 in the form of a load-haul-dump (LHD) vehicle, such as for mining, including a dump bucket 102, wheels 104, 106, an operator control cabin 108, and a vehicle body 110. The wheels 104, 106 are traction components. In other examples, the electric machine 100 can include a traction component such as one or more tracks, in addition to or instead of the wheels.

The electric machine 100, e.g., an electric mine truck, also includes an electrical system 112. The electrical system 112 can include a DC power source, including but not limited to one or more battery strings, which can supply power to, among other things, an electric motor. The electric motor can supply rotational power to one or more systems, such as a system configured to operate various hydraulics of the dump bucket 102. The electrical system 112 can supply power to at least one traction component, such as the wheel 104, 106, and to at least one accessory component, such a pump, fan, and the like.

In some examples, the electric machine 100 can include electric vehicles, such as cars, trucks, motorcycles, buses, and the like. Although the techniques of this disclosure may be especially suited to use in battery-powered machines, the techniques could be used in hybrid-powered machines.

Figure 2:
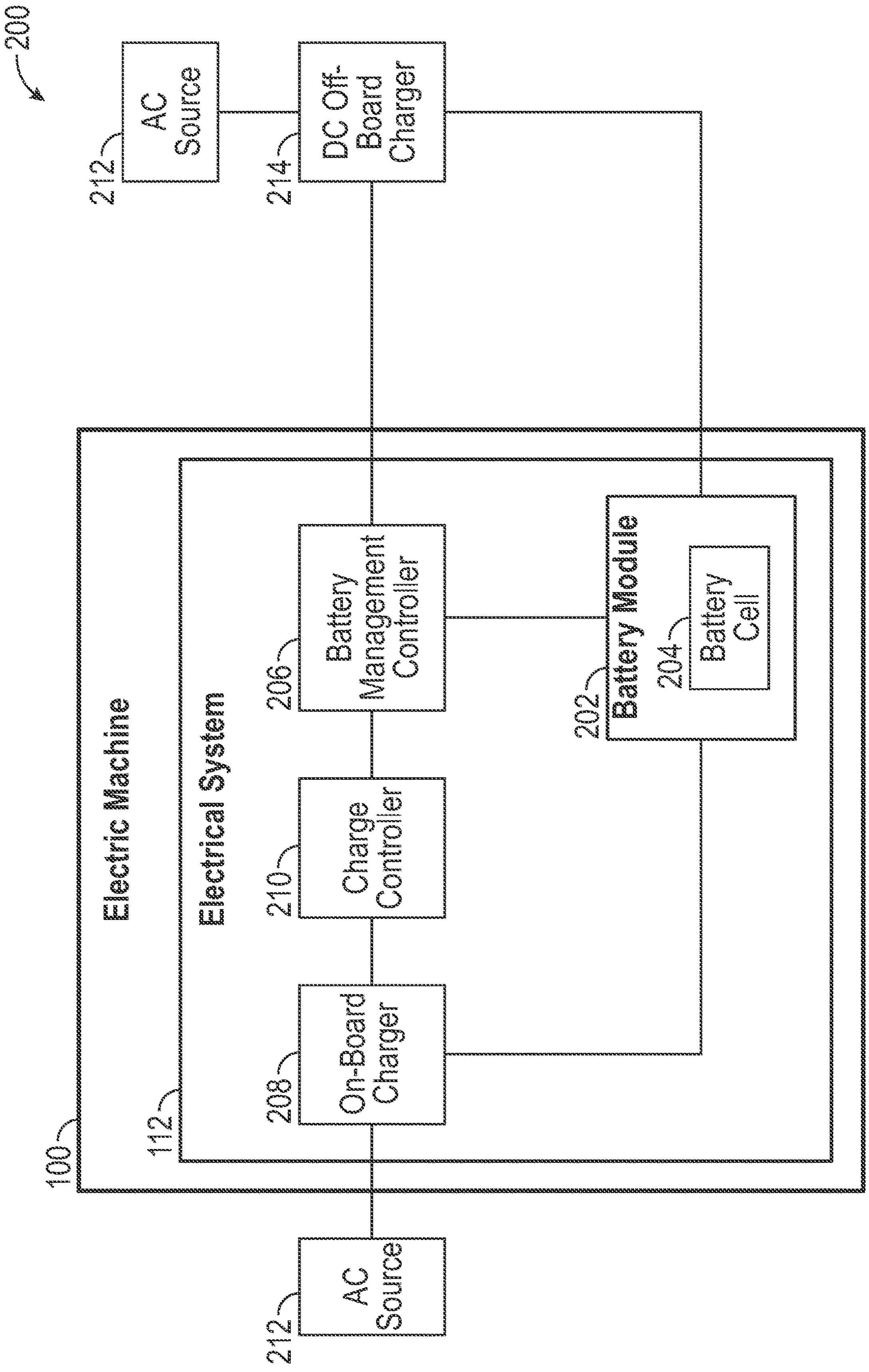
FIG. 2 is a block diagram of an example of a charging system that can be applied to an electric machine.

FIG. 2 is a block diagram of an example of a charging system 200 that can be applied to an electric machine 100. As described above with respect to FIG. 1, the electric machine 100 of FIG. 1 includes an electrical system 112. The electrical system 112 can include one or more battery modules 202, where each battery module 202 includes one or more rechargeable battery cells 204.

The electrical system 112 includes a battery management controller 206 that is in communication with the battery modules 202, such as to receive voltage and/or state of charge information. State of charge (SOC) refers to the current amount of stored electrical energy in a battery, expressed as a percentage of its maximum capacity. SOC represents the immediate level of charge available in the battery at a given time. SOC indicates how much energy is remaining in the battery, with 0% indicating a completely discharged battery and 100% indicating a fully charged battery. SOC changes dynamically as the battery is discharged or charged. Monitoring SOC is crucial for estimating the battery's runtime, determining when to recharge, and preventing over-discharging or overcharging.

The battery cells 204 can be charged via an on-board charger 208 or a DC off-board charger 214. The on-board charger 208 and the DC off-board charger 214 are coupled with an AC source 212, which can include an electrical grid, an electrical microgrid, or the output of a generator.

Typically, the on-board charger 208 is sized to output less DC power than the DC off-board charger 214, e.g., about 7 kW-11 kW versus about 150 KW-300 kW As such, for fast-charging applications, the DC off-board charger 214 can be preferable to the on-board charger 208. The on-board charger 208 can be used to provide relatively slow charging (or "trickle" charging) to the battery cell 204. Some electric machines can have two on-board chargers.

The on-board charger 208 can communicate with the battery management controller 206 via a charge controller 210. The DC off-board charger 214 can also communicate with the battery management controller 206. In this manner, both the on-board charger 208 and the DC off-board charger 214 can obtain SOC information, for example, about the battery module 202. The battery management controller 206 can communicate voltage and/or current requests with the on-board charger 208 and/or the DC off-board charger 214.

Figure 3:
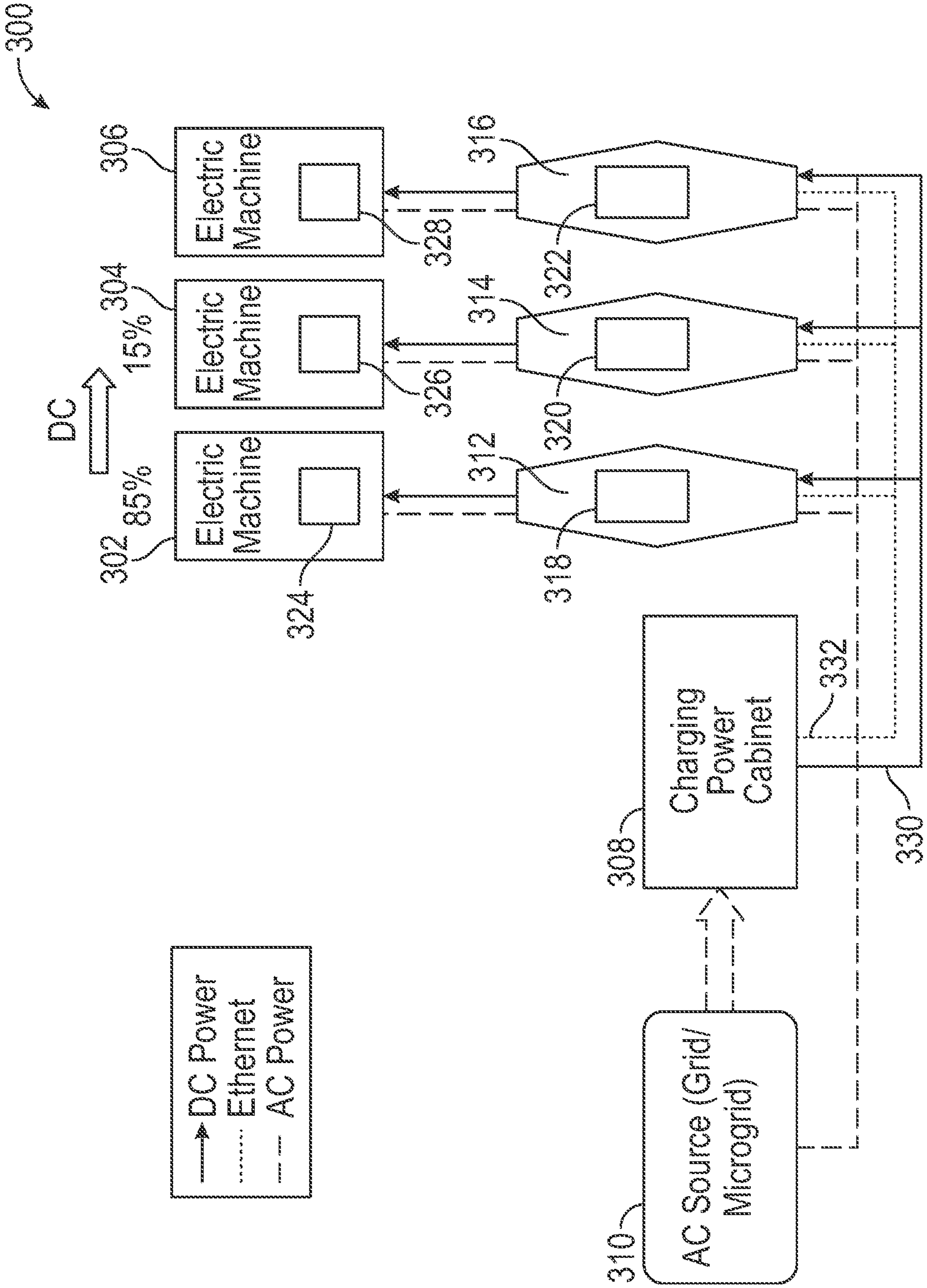
FIG. 3 is a block diagram of an example of a charging system for charging a first electric machine and a second electric machine using various techniques of this disclosure.

FIG. 3 is a block diagram of an example of a charging system 300 for charging a first electric machine and a second electric machine using various techniques of this disclosure. The charging system 300 can include a first electric machine 302 and a second electric machine 304. In other example configurations, the charging system 300 can further include a third electric machine 306, or even more electric machines. An example of an electric machine is the electric machine 100 of FIG. 1, e.g., an industrial LHD vehicle. The techniques of this disclosure are not limited to industrial electric machines, such as in FIG. 1. Rather, this disclosure considers electric machines to also include, for example, passenger cars and trucks, buses, and commercial vehicles, such as trucks.

The charging system 300 further includes a charging power cabinet 308 that is configured to electrically couple with an AC source 310, such as the AC source 212 in FIG. 2. The charging power cabinet 308 includes AC/DC converter circuitry that is configured to convert AC power from the AC source 310 to DC power 330. In some examples, the charging power cabinet 308 is a 150 KW-300 kW charger.

The charging system 300 further includes a first electric power dispenser 312 configured to electrically couple with the charging power cabinet 308 and the first electric machine 302. The first electric power dispenser 312 is configured to receive the DC power 330 from the charging power cabinet 308 and provide the DC power to charge a plurality of battery modules of the first electric machine 302, such as the battery module 202 of FIG. 2. In addition, the first electric power dispenser 312 is configured to receive AC power from the AC source 310 and provide the AC power to an on-board charger of the first electric machine 302, such as the on-board charger 208 of FIG. 2, to charge a plurality of battery modules of the first electric machine 302, such as the battery module 202 of FIG. 2.

The charging system 300 further includes a second electric power dispenser 314 configured to electrically couple with the charging power cabinet 308 and the second electric machine 304. The second electric power dispenser 314 is configured to receive the DC power 330 from the charging power cabinet 308 and provide the DC power to charge a plurality of battery modules of the second electric machine 304, such as the battery module 202 of FIG. 2. In addition, the second electric power dispenser 314 is configured to receive AC power from the AC source 310 and provide the AC power to an on-board charger of the second electric machine 304, such as the on-board charger 208 of FIG. 2, to charge a plurality of battery modules of the second electric machine 304, such as the battery module 202 of FIG. 2.

In some examples, the charging system 300 further includes a third electric power dispenser 316 configured to electrically couple with the charging power cabinet 308 and the third electric machine 306. The third electric power dispenser 316 is configured to receive the DC power 330 from the charging power cabinet 308 and provide the DC power to charge a plurality of battery modules of the third electric machine 306, such as the battery module 202 of FIG. 2. In addition, the third electric power dispenser 316 is configured to receive AC power from the AC source 310 and provide the AC power to an on-board charger of the third electric machine 306, such as the on-board charger 208 of FIG. 2, to charge a plurality of battery modules of the third electric machine 306, such as the battery module 202 of FIG. 2.

In some examples, each of the first electric power dispenser 312, the second electric power dispenser 314, and the third electric power dispenser 316 can include a corresponding controller, such as a controller 318, a controller 320, and a controller 322, respectively. Similarly, in some examples, each of the first electric machine 302, the second electric machine 304, and the third electric machine 306 can include a corresponding controller, such as a controller 324, a controller 326, and a controller 328, respectively. The controllers in the electric power dispensers or in the electric machines can be similar to the battery management controller 206 of FIG. 2.

In some examples, the charging power cabinet 308 can communicate with the first electric power dispenser 312, the second electric power dispenser 314, and the third electric power dispenser 316, such as their controllers. For example, the charging power cabinet 308 can communicate with the electric power dispensers using wired communication 332, e.g., Ethernet. In some examples, the charging power cabinet 308 can communicate with the electric power dispensers using a wireless communication 332. In some examples, the various controllers can communicate with one another directly or indirectly.

In some examples, a controller in the first electric machine 302, such as the controller 324 in the first electric machine 302, is configured to receive, while the first electric machine 302 receives DC power via the first electric power dispenser 312 and while the second electric machine 304 receives AC power via the second electric power dispenser 314, data representing a state of charge of the plurality of battery modules of the first electric machine 302. The controller can then compare the representation of the state of charge of the plurality of battery modules of the first electric machine to a threshold value. When the state of charge of the plurality of battery modules of the first electric machine exceeds the threshold value, the controller can control the termination of the delivery, such as by outputting a control signal, of the DC power from the first electric power dispenser 312 to the first electric machine 302. Then, the controller can control the commencement of the delivery, such as by outputting a control signal, of the AC power from the first electric power dispenser 312 to an onboard charger of the first electric machine 302.

For example, the controller 324 of the first electric machine 302 can receive data representing an SOC of the plurality of battery modules of the first electric machine 302. By way of a non-limiting example solely for the purposes of explanation, assume that a threshold value is an SOC of 85% and assume that the SOC of the plurality of battery modules of the first electric machine 302 is 86%. The controller 324 can then compare the representation of the state of charge of the plurality of battery modules of the first electric machine (86%) to the threshold value (85%). Because the state of charge of the plurality of battery modules of the first electric machine 302 exceeds the threshold value, the controller 324 can output a control signal to terminate the delivery of the DC power from the first electric power dispenser 312 to the first electric machine 302. Then, the controller 324 can control the commencement of the delivery, such as by outputting a control signal, of the AC power from the first electric power dispenser 312 to an onboard charger of the first electric machine 302.

In some examples, the first electric power dispenser 312 is configured to deliver the DC power at a first rate, and the first electric power dispenser 312 is configured to deliver the AC power at a second rate less than the first rate. In an example, the first rate is greater than 100 KW and the second rate is less than 25 kW.

Meanwhile, as the first electric power dispenser 312 is delivering AC power to the onboard charger of the first electric machine 302 in response to the state of charge of the plurality of battery modules of the first electric machine 302 exceeding the threshold value, a controller located within another one of the electric power dispensers, such as the controller 326 in the second electric machine 304, is configured to control the termination of the delivery of the AC power from the second electric power dispenser 314 to an onboard charger of the second electric machine 304. Then, the controller 326 can control the commencement of the delivery of the DC power from the charging power cabinet 308, via the second electric power dispenser 314, to the second electric machine 304.

In this manner, the batteries in the second electric machine 304 can be charging via AC power from the second electric power dispenser 314 while the first electric machine 302 is charging via DC power from the first electric power dispenser 312. The first electric power dispenser 312 can use the charging power cabinet 308, via the first electric power dispenser 312, to quickly charge the batteries of the first electric machine 302 until the threshold value is reached. At that point, the second electric machine 304 can be charged with the DC power instead of the previously-supplied AC power, and AC power can be supplied to the on-board charger of the first electric machine 302 so as to bring the SOC of the batteries of the first electric machine 302 closer to 100%.

The controller 326 of the second electric machine 304 can receive data representing an SOC of the plurality of battery modules of the second electric machine 304. By way of a non-limiting example solely for the purposes of explanation, assume that a threshold value is an SOC of 85% and assume that the SOC of the plurality of battery modules of the second electric machine 304 is 86%. The controller 326 can then compare the representation of the state of charge of the plurality of battery modules of the third electric machine 306 (86%) to the threshold value (85%). Because the state of charge of the plurality of battery modules of the second electric machine 304 exceeds the threshold value, the controller 326 can output a control signal to terminate the delivery of the DC power from the controller 320 to the second electric machine 304. Then, the controller 326 can control the commencement of the delivery, such as by outputting a control signal, of the AC power from the second electric power dispenser 314 to an onboard charger of the second electric machine 304.

Meanwhile, as the first electric power dispenser 312 is delivering AC power to the onboard charger of the first electric machine 302 and the second electric power dispenser 314 is delivering AC power to the onboard charger of the second electric machine 304, the controller 328 in the third electric machine 306 is configured to control the termination of the delivery of the AC power from the third electric power dispenser 316 to an onboard charger of the third electric machine 306. Then, the controller 328 can control the commencement of the delivery of the DC power from the charging power cabinet 308, via the third electric power dispenser 316, to the third electric machine 306. By using this techniques, sequential DC fast charging of electric machines is achieved while allowing simultaneous AC charging.

It should be noted that all the techniques were specifically described above with respect to the controllers of the first electric machine 302, the second electric machine 304, and the third electric machine 306, in some examples, the controllers of the first electric power dispenser 312, the second electric power dispenser 314, and the third electric power dispenser 316 can instead be used.

Figure 4:
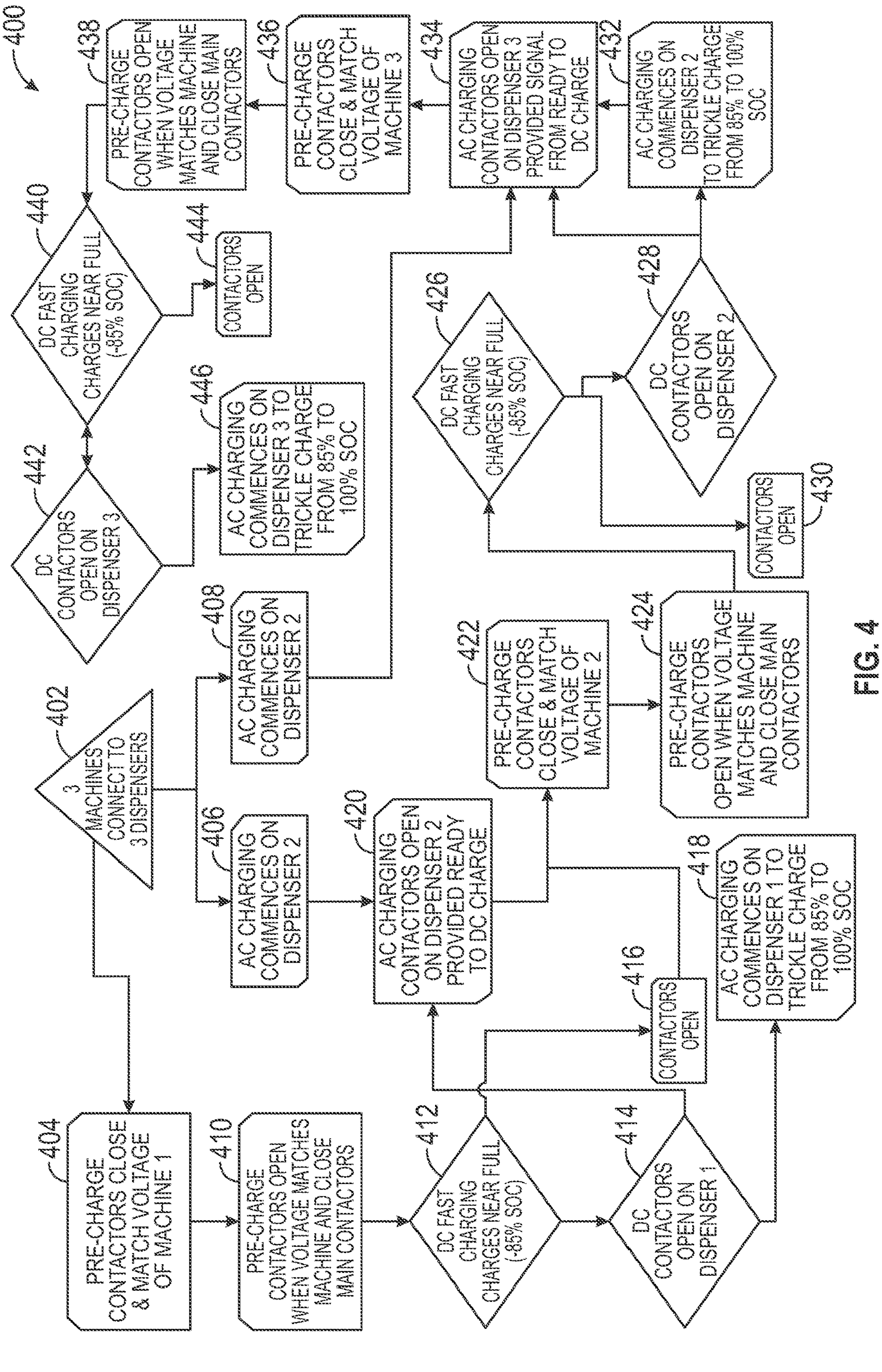
FIG. 4 is a flow diagram of an example of a method of charging electric machines, using various techniques of this disclosure.

FIG. 4 is a flow diagram of an example of a method of charging electric machines, using various techniques of this disclosure. The method 400 starts at block 402 with three electric machines connected to three electric power dispensers. At block 404, the charging power cabinet 308 can control various pre-charge contactors to close and match the voltage of the first electric machine 302. Meanwhile, at block 406, the second electric power dispenser 314 begins AC charging of the second electric machine 304 and, at block 408, the third electric power dispenser 316 begins AC charging of the third electric machine 306.

At block 410, the charging power cabinet 308 can control the various pre-charge contactors to open when the voltage matches the voltage of the first electric machine 302 and can control the main contactors to close.

At block 412, the first electric power dispenser 312 begins DC fast charging of the first electric machine 302 until the threshold value is reached, e.g., 85% SOC. It should noted that 85% SOC has been used for purposes of explanation only and is not the only threshold value that can be selected. In some examples, the threshold value can be greater than 85% and in other examples, the threshold value can be less than 85%.

At block 414, a controller can control the opening of the contactors associated with the first electric power dispenser 312 and at block 416 the charging power cabinet 308 can open its contactors. In addition, at block 418, the controller can cause the first electric power dispenser 312 to begin AC charging of the first electric machine 302 to trickle charge the batteries from 85% SOC toward 100% SOC. At block 420, the controller can control the opening of the AC charging contactors associated with the second electric power dispenser 314, provided that the charging power cabinet 308 is ready to DC charge. The system is now ready to begin DC charging of the second electric machine 304 while AC charging the first electric machine 302 and the third electric machine 306.

At block 422, the charging power cabinet 308 can control various pre-charge contactors to close and match the voltage of the second electric machine 304. At block 424, the charging power cabinet 308 can control the various pre-charge contactors to open when the voltage matches the voltage of the second electric machine 304 and can control the main contactors to close.

At block 426, the second electric power dispenser 314 begins DC fast charging of the second electric machine 304 until the threshold value is reached, e.g., 85% SOC. At block 428, a controller can control the opening of the contactors associated with the second electric machine 304 and at block 430 the charging power cabinet 308 can open its contactors.

At block 432, the controller can cause the second electric power dispenser 314 to begin AC charging of the second electric machine 304 to trickle charge the batteries from 85% SOC toward 100% SOC. At block 434, the controller can control the opening of the AC charging contactors associated with the third electric power dispenser 316, provided that the charging power cabinet 308 is ready to DC charge. The system is now ready to begin DC charging of the third electric machine 306 while AC charging the first electric machine 302 and the second electric machine 304.

At block 436, the charging power cabinet 308 can control various pre-charge contactors to close and match the voltage of the third electric machine 306. At block 438, the charging power cabinet 308 can control the various pre-charge contactors to open when the voltage matches the voltage of the third electric machine 306 and can control the main contactors to close.

At block 440, the third electric power dispenser 316 begins DC fast charging of the third electric machine 306 until the threshold value is reached, e.g., 85% SOC. At block 442, a controller can control the opening of the contactors associated with the third electric power dispenser 316 and at block 444 the charging power cabinet 308 can open its contactors. At block 446, the controller can cause the second electric power dispenser 314 to begin AC charging of the second electric machine 304 to trickle charge the batteries from 85% SOC toward 100% SOC.

Figure 5:
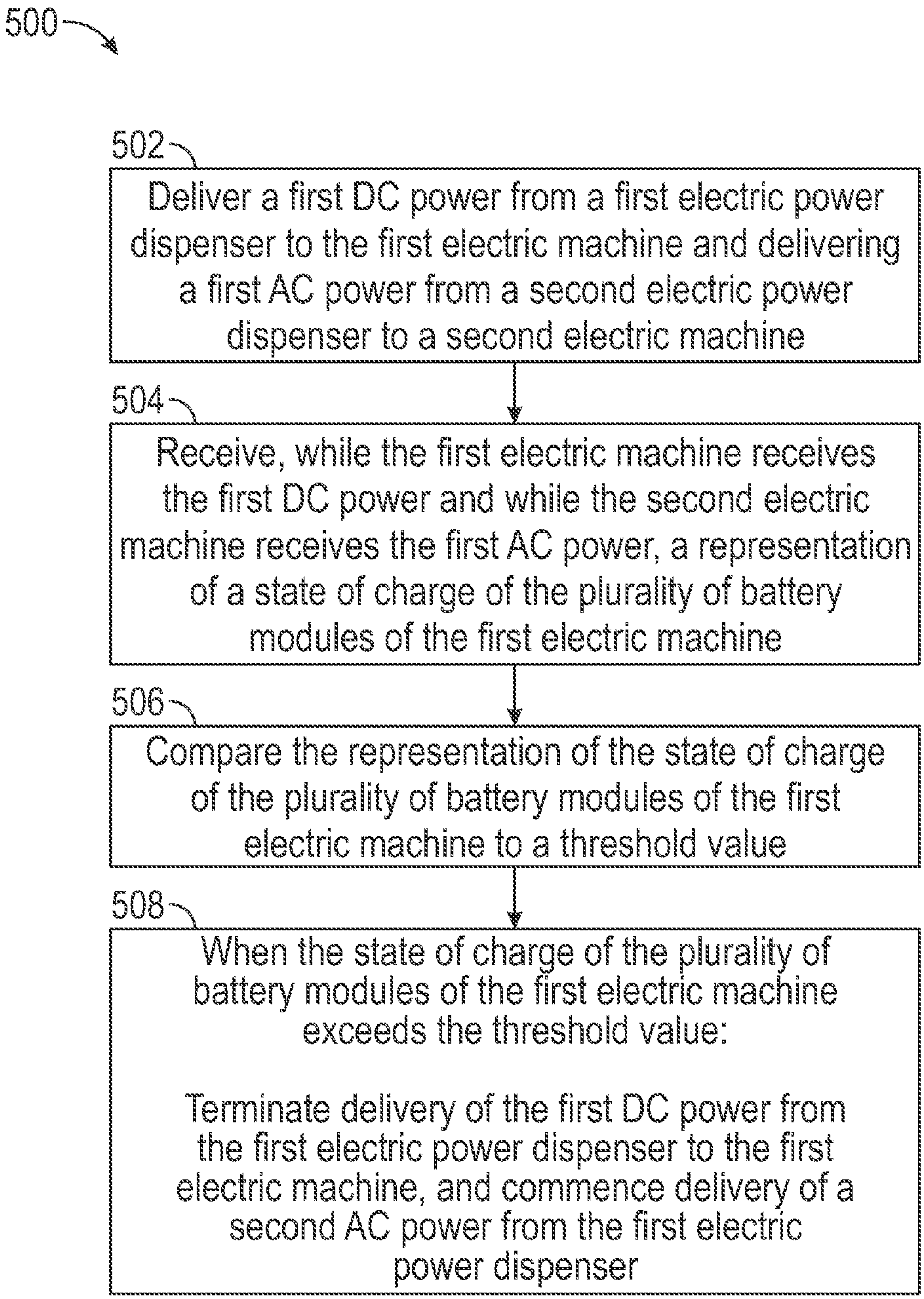
FIG. 5 is an example of a method for charging a first electric machine and a second electric machine.

FIG. 5 is an example of a method 500 for charging a first electric machine and a second electric machine. At 502, the method 500 includes delivering a first DC power from a first electric power dispenser to the first electric machine and delivering a first AC power from a second electric power dispenser to a second electric machine.

At block 504, the method 500 includes receiving, while the first electric machine receives the first DC power and while the second electric machine receives the first AC power, a representation of a state of charge of the plurality of battery modules of the first electric machine At block 506, the 500 includes comparing the representation of the state of charge of the plurality of battery modules of the first electric machine to a threshold value.

At block 508, the method 500 includes when the state of charge of the plurality of battery modules of the first electric machine exceeds the threshold value: terminate delivery of the first DC power from the first electric power dispenser to the first electric machine, and commence delivery of a second AC power from the first electric power dispenser.

In some examples, when the state of charge of the plurality of battery modules of the first electric machine exceeds the threshold value, the method 500 includes terminating delivery of the first AC power from the second electric power dispenser to the second electric machine, and commencing delivery of a second DC power from the second electric power dispenser to the second electric machine.

In some examples, delivering the first DC power from the first electric power dispenser to the first electric machine and delivering the first AC power from the second electric power dispenser to the second electric machine includes delivering the first DC power at a first rate and delivering the first AC power at a second rate less than the first rate.

In some examples, while delivering the first DC power from the first electric power dispenser to the first electric machine and while delivering the first AC power from the second electric power dispenser to a second electric machine, the method 500 includes delivering a third AC power from a third electric power dispenser to a third electric machine.

In some examples, terminating delivery of the first AC power from the second electric power dispenser to the second electric machine includes controlling the opening of a DC charging contactor on the first electric power dispenser, and commencing delivery of the second DC power from the second electric power dispenser to the second electric machine includes controlling the opening of an AC charging contactor on the second electric power dispenser.

In some examples, the method 500 includes controlling the closing of a pre-charge contactor to match a voltage of a DC charger to a voltage of the first electric machine, and when the voltage of the first electric machine matches the voltage of the DC charger: controlling the opening of the pre-charge contactor, and controlling the closing of a DC charging contactor.

INDUSTRIAL APPLICABILITY

The described invention relates to techniques for charging electric battery-powered machines, demonstrating clear industrial applicability. As explained, battery electric machines rely on battery modules to operate, making battery charging critical. The invention offers solutions for reducing charging times of multiple electric machines by utilizing both DC and AC charging.

Faster charging of electric vehicles has tangible real-world benefits. The techniques allow more vehicles to be charged in a given time, increasing productivity and efficiency. Being able to quickly charge multiple vehicles has applicability across various industries that utilize electric machines, like mining, construction, transportation, etc.

Moreover, the invention solves recognized problems with existing charging limitations that increase total charge times for multiple vehicles. By coordinating DC and AC charging, the techniques optimize the charging process. This provides the practical benefit of keeping more machines operational and available.

In summary, the described invention has evident industrial uses in charging electric battery machines. The techniques offer practical solutions to deficiencies in current charging approaches. By reducing charge times, the invention improves productivity and efficiency for electric vehicle fleets across industries. Therefore, the information clearly establishes the industrial applicability of the techniques outlined.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

The above detailed description is intended to be illustrative, and not restrictive. The scope of the disclosure should, therefore, be determined with references to the appended claims, along with the full scope of equivalents to which such claims are entitled.

What is claimed is:

1. A charging system for charging a first electric machine and a second electric machine, the system comprising:

- a charging power cabinet configured to electrically couple with an AC source, the charging power cabinet configured to convert an AC voltage from the AC source to a DC voltage;
- a first electric power dispenser configured to electrically couple with the charging power cabinet and the first electric machine, the first electric power dispenser configured to provide either first AC power or first DC power to charge a plurality of battery modules of the first electric machine;
- a second electric power dispenser configured to electrically couple with the charging power cabinet and the second electric machine, the second electric power dispenser configured to provide either second AC power or second DC power to charge a plurality of battery modules of the second electric machine; and
- a controller configured to:
  - receive, while the first electric machine receives the first DC power and while the second electric machine receives the second AC power, a representation of a state of charge of the plurality of battery modules of the first electric machine;
  - compare the representation of the state of charge of the plurality of battery modules of the first electric machine to a threshold value;
  - when the state of charge of the plurality of battery modules of the first electric machine exceeds the threshold value:
    - control termination of delivery of the first DC power from the first electric power dispenser to the first electric machine; and
    - control commencement of delivery of the first AC power from the first electric power dispenser to a first onboard charger of the first electric machine.

2. The charging system of claim 1, wherein the controller is a first controller located within the first electric power dispenser, the system further comprising:

- a second controller located within the second electric power dispenser, the second controller configured to:
- when the state of charge of the plurality of battery modules of the first electric machine exceeds the threshold value:
  - control termination of delivery of the second AC power from the second electric power dispenser to a second onboard charger of the second electric machine; and
  - control commencement of delivery of the second DC power from the second electric power dispenser to the second electric machine.

3. The charging system of claim 2, further comprising:
a third electric machine;
a third electric power dispenser configured to electrically couple with the charging power cabinet and the third electric machine, the third electric power dispenser configured to provide either third AC power or third DC power to charge a plurality of battery modules of the third electric machine;
a third controller located within the third electric power dispenser, the third controller configured to:
when the state of charge of the plurality of battery modules of the second electric machine exceeds the threshold value:
control termination of delivery of the third AC power from the third electric power dispenser to a third onboard charger of the third electric machine; and
control commencement of delivery of the third DC power from the third electric power dispenser to the third electric machine.

4. The charging system of claim 3, wherein when the state of charge of the plurality of battery modules of the second electric machine exceeds the threshold value, the second controller is configured:
control termination of delivery of the second DC power from the second electric power dispenser to the second electric machine; and
control commencement of delivery of the second AC power from the second electric power dispenser to a second onboard charger of the second electric machine.

5. The charging system of claim 1, wherein the controller is a first controller located within the first electric machine, the system further comprising a second controller located within the second electric machine and configured to:
when the state of charge of the plurality of battery modules of the first electric machine exceeds the threshold value:
control termination of delivery of the second AC power from the second electric power dispenser to the second electric machine; and
control commencement of delivery of the second DC power from the second electric power dispenser to the second electric machine.

6. The charging system of claim 5, further comprising:
a third electric machine;
a third electric power dispenser configured to electrically couple with the charging power cabinet and the third electric machine, the third electric power dispenser configured to provide either third AC power or third DC power to charge a plurality of battery modules of the third electric machine;
a third controller located within the third electric machine, the third controller configured to:
when the state of charge of the plurality of battery modules of the second electric machine exceeds the threshold value:
control termination of delivery of the third AC power from the third electric power dispenser to a third onboard charger of the third electric machine; and
control commencement of delivery of the third DC power from the third electric power dispenser to the third electric machine.

7. The charging system of claim 6, wherein when the state of charge of the plurality of battery modules of the second electric machine exceeds the threshold value, the second controller is configured:
control termination of delivery of the second DC power from the second electric power dispenser to the second electric machine; and
control commencement of delivery of the second AC power from the second electric power dispenser to a second onboard charger of the second electric machine.

8. The charging system of claim 1, wherein the first electric power dispenser is configured to deliver the first DC power at a first rate, and wherein the first electric power dispenser is configured to deliver the first AC power at a second rate less than the first rate.

9. The charging system of claim 8, wherein the first rate is greater than 100 KW and the second rate is less than 25 kW.

10. A method for charging a first electric machine and a second electric machine, the method comprising:
delivering a first DC power from a first electric power dispenser to the first electric machine and delivering a first AC power from a second electric power dispenser to a second electric machine;
receiving, while the first electric machine receives the first DC power and while the second electric machine receives the first AC power, a representation of a state of charge of a plurality of battery modules of the first electric machine;
comparing the representation of the state of charge of the plurality of battery modules of the first electric machine to a threshold value;
when the state of charge of the plurality of battery modules of the first electric machine exceeds the threshold value:
terminating delivery of the first DC power from the first electric power dispenser to the first electric machine; and
commencing delivery of a second AC power from the first electric power dispenser to the first electric machine.

11. The method of claim 10, comprising:
when the state of charge of the plurality of battery modules of the first electric machine exceeds the threshold value:
terminating delivery of the first AC power from the second electric power dispenser to the second electric machine; and
commencing delivery of a second DC power from the second electric power dispenser to the second electric machine.

12. The method of claim 10, wherein delivering the first DC power from the first electric power dispenser to the first electric machine and delivering the first AC power from the second electric power dispenser to the second electric machine comprises:
delivering the first DC power at a first rate and delivering the first AC power at a second rate less than the first rate.

13. The method of claim 10, comprising:
while delivering the first DC power from the first electric power dispenser to the first electric machine and while delivering the first AC power from the second electric power dispenser to a second electric machine:
delivering a third AC power from a third electric power dispenser to a third electric machine.

14. The method of claim 10, wherein terminating delivery of the first AC power from the second electric power dispenser to the second electric machine includes:
controlling the opening of a DC charging contactor on the first electric power dispenser, and wherein commencing delivery of the second DC power from the second electric power dispenser to the second electric machine includes:

controlling the opening of an AC charging contactor on the second electric power dispenser.

15. The method of claim 10, further comprising:

controlling the closing of a pre-charge contactor to match a voltage of a DC charger to a voltage of the first electric machine; and when the voltage of the first electric machine matches the voltage of the DC charger:

controlling the opening of the pre-charge contactor; and controlling the closing of a DC charging contactor.

16. A charging system for charging a first electric machine and a second electric machine, the system comprising:

a controller configured to:

receive, while the first electric machine receives a first DC power and while the second electric machine receives a second AC power, a representation of a state of charge of the plurality of battery modules of the first electric machine;

compare the representation of the state of charge of a plurality of battery modules of the first electric machine to a threshold value;

when the state of charge of the plurality of battery modules of the first electric machine exceeds the threshold value:

control termination of delivery of the first DC power from a first electric power dispenser to the first electric machine; and control commencement of delivery of the first AC power from the first electric power dispenser to a first onboard charger of the first electric machine.

17. The charging system of claim 16, wherein the controller is a first controller located within the first electric machine.

18. The charging system of claim 16, wherein the controller is a first controller located within a first electric power dispenser.

19. The charging system of claim 16, wherein the controller is a first controller, the system further comprising:

a second controller configured to:

when the state of charge of the plurality of battery modules of the first electric machine exceeds the threshold value:

control termination of delivery of the second AC power from the second electric power dispenser to a second onboard charger of the second electric machine; and control commencement of delivery of the second DC power from the second electric power dispenser to the second electric machine.

20. The charging system of claim 19, further comprising:

a third controller configured to:

when the state of charge of the plurality of battery modules of the second electric machine exceeds the threshold value:

control termination of delivery of a third AC power from the third electric power dispenser to a third onboard charger of the third electric machine; and control commencement of delivery of a third DC power from the third electric power dispenser to the third electric machine.

* * * * *